(12) United States Patent
DaPrato

(10) Patent No.: US 6,238,154 B1
(45) Date of Patent: May 29, 2001

(54) LATERAL VEHICLE CARGO RESTRAINT TOOL

(76) Inventor: James A. DaPrato, P.O. Box 132 Rio Oso Rd., Rio Oso, CA (US) 95674

(*) Notice: Subject to any disclaimer, the term of this patent is extended or adjusted under 35 U.S.C. 154(b) by 0 days.

(21) Appl. No.: 09/312,750

(22) Filed: May 13, 1999

(51) Int. Cl.[7] ....................................................... B60P 7/15
(52) U.S. Cl. .......................... 410/151; 410/121; 410/143; 410/155
(58) Field of Search ............................. 410/121, 143–145, 410/151, 150, 129, 155, 127, 122; 211/105.3; 248/354.1; 224/551, 552

(56) References Cited

U.S. PATENT DOCUMENTS

| | | |
|---|---|---|
| 2,971,797 | 2/1961 | Watters . |
| 2,973,934 | 3/1961 | Foster . |
| 3,699,898 | 10/1972 | Nolan . |
| 4,236,854 | 12/1980 | Rogers ................................. 410/121 |
| 4,343,578 | 8/1982 | Barnes ................................. 410/151 |
| 4,434,970 | 3/1984 | Boland . |
| 4,492,499 * | 1/1985 | Gasper ............................. 410/155 X |
| 4,650,383 * | 3/1987 | Hoff ................................. 410/150 X |
| 4,737,056 | 4/1988 | Hunt . |
| 4,772,165 | 9/1988 | Bartkus ................................. 410/139 |
| 5,028,185 | 7/1991 | Shannon ................................. 410/151 |
| 5,082,404 * | 1/1992 | Stewart et al. ........................ 410/127 |
| 5,092,504 * | 3/1992 | Hannes et al. .................... 410/151 X |
| 5,094,576 | 3/1992 | Fredelius ................................ 410/151 |
| 5,265,993 | 11/1993 | Wayne ................................. 410/129 |
| 5,472,301 | 12/1995 | Wallen ................................. 410/151 |
| 5,934,850 * | 8/1999 | Soumar et al. ....................... 410/155 |
| 5,971,685 * | 10/1999 | Owens ................................. 410/151 |
| 5,988,962 | 11/1999 | Santa Cruz ........................... 410/151 |
| 5,997,228 * | 12/1999 | Potter ................................. 410/155 |
| 6,042,312 * | 3/2000 | Durham, II ........................... 410/143 |

* cited by examiner

Primary Examiner—Stephen T. Gordon
(74) Attorney, Agent, or Firm—Heisler & Associates

(57) ABSTRACT

An apparatus in the form of a lateral vehicle restraint tool 10 is described for restraining cargo 8 within a trailer bay 3 in a lateral direction. The tool 10 includes a fastener 12, and a restraint arm 40 integrally joined to the fastener 12. The tool 10 can be releasably affixed to a laterally extending load lock device 2. The load lock 2 is positioned securely laterally between a first and second side wall 4, 6 and the fastener 12 is securely attached thereon. The restraint arm 40 extends from the fastener 12 and presses against one side of the cargo 8. As such, the cargo 8 is restrained from moving in a lateral direction. Optional features include an extension sleeve 40 and a rod 60. The extension sleeve 40 increases the length of the arm 40 and hence the size of the cargo 8 that can be restrained. The rod 60 connects longitudinally spaced tools 10 and thereby restrains longitudinally positioned cargo 8 resting between fore and aft tool 10/load lock 2 combinations.

12 Claims, 4 Drawing Sheets

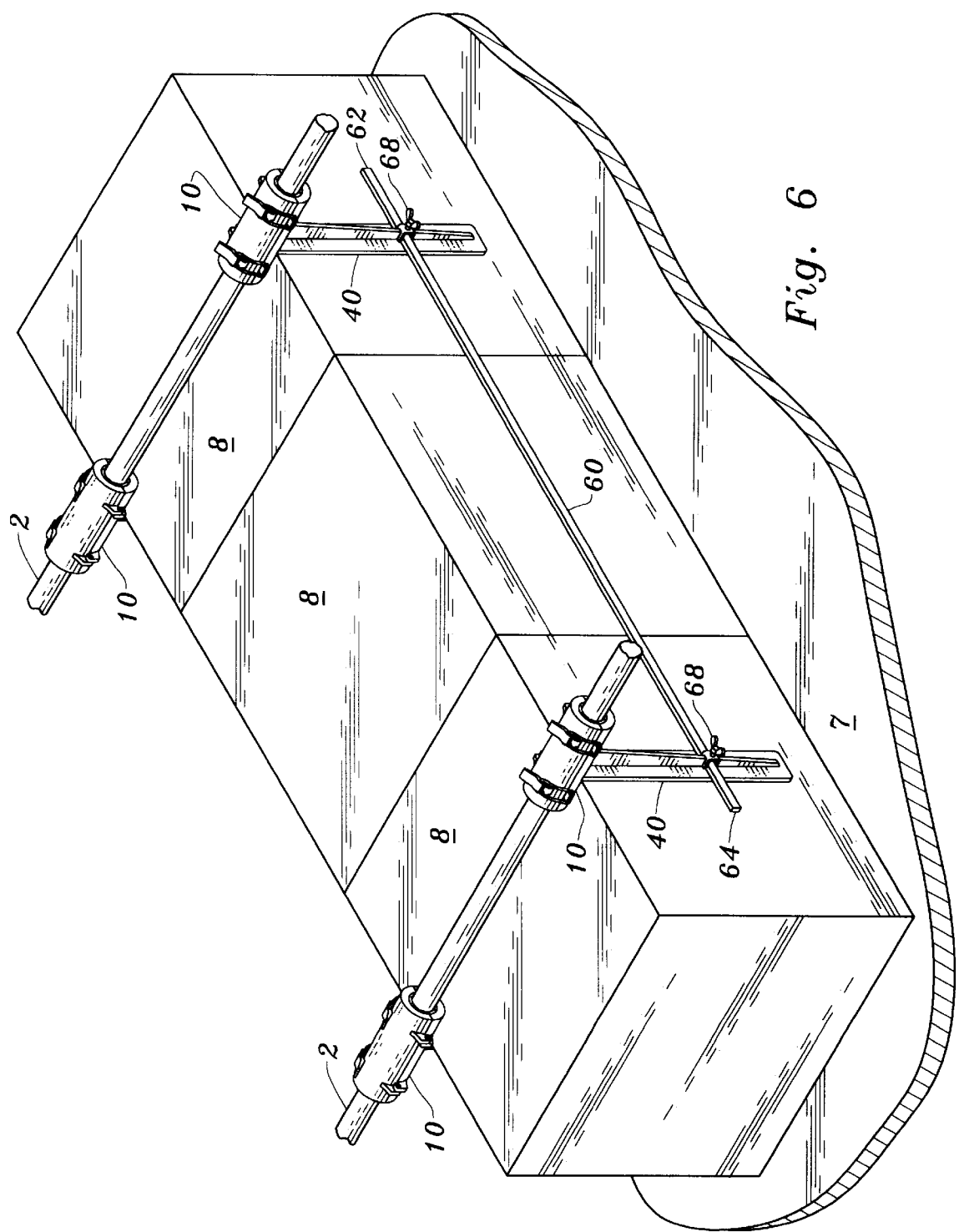

LATERAL VEHICLE CARGO RESTRAINT TOOL

FIELD OF THE INVENTION

The following invention relates to an apparatus for securing cargo during transportation. More specifically, this invention relates to a vehicle cargo restraint tool that attaches to a laterally extending load lock device to prevent lateral movement of the cargo. Lateral movement is prevented by contact between the cargo and a restraint arm that extends radially outward from a fastener/collar grippably attached to the load lock.

BACKGROUND OF THE INVENTION

In the cargo restraint arts, a substantial array of devices have been devised to prevent cargo from moving inside a vehicle during transport. These devices are constructed and arranged within the vehicle and about the cargo to substantially prevent lateral, longitudinal, and off-axis movement. This prevents shifting cargo from damaging itself, the transport vehicle and other vehicles, public and private property, and people (should the cargo escape or cause the transport vehicle to become uncontrollable).

Some typical prior art cargo restrain devices include:

| Inventor | U.S. Pat. No. |
| --- | --- |
| Watters | 2,971,797 |
| Foster | 2,973,934 |
| Rogers | 4,236,854 |
| Barnes | 4,343,578 |
| Bartkus | 4,772,165 |
| Shannon | 5,028,185 |
| Wayne | 5,265,993 |
| Wallen | 5,472,301 |

These prior art cargo restraint devices consist of rods or panels that attach to or abut the walls of the transport vehicle. The rods or panels generally contact opposing sides of the cargo and thereby restrain the cargo to movement parallel to the rods or panels. Cross-rod and cross-panel members are generally attached perpendicular to the rods and panels, contact the cargo on opposing sides, and thereby restrain the cargo from movement parallel to the cross-rods and cross-panels. One variation on this approach, taught by Shannon in U.S. Pat. No. 5,028,185, is to use one cross-rod or cross-panel member to contact one side of the cargo and use a wall to restrain the opposing side. Again, in conjunction with the rods or panels the cargo is restrained from moving in the lateral, longitudinal, or off-axis direction.

The prior art approaches have several drawbacks. Some devices come into contact with the cargo over a very narrow range of height. This tends to restrict the cargo being restrained to a single unit, as opposed to restraining several like units of cargo stacked on top of one another. Some devices only restrict longitudinal movement with rods or panels and depend on friction or other means for restraining cargo in the lateral direction. These devices can result in the type of damage described above or lead to the use of unreliable means to restrain the cargo. Furthermore, the prior art cargo restraints are self-contained and do not take advantage of existing laterally extending load lock devices that simply and easily restrain cargo in the longitudinal direction. Such load lock devices are typified by the devices disclosed by Barnes in U.S. Pat. No. 4,343,578 and Wallen in U.S. Pat. No. 5,472,301. Such lateral extending members simply need an effective device that easily attaches to the load lock to prevent movement in the lateral direction.

Accordingly, a need exists for an apparatus and method that restrains cargo laterally with greater versatility, effectiveness, and simplicity than the prior art.

SUMMARY OF THE INVENTION

The cargo lateral restraint tool of this invention solves the problems of inability to attach to existing laterally extending load locks, cargo restraint limitations, and excessive complexity associated with the prior art. Specifically, the tool incorporates novel design characteristics that address each problem. First, the tool has a fastener that conformably attaches to a laterally extending load lock. The fastener is integrally joined to a rigid restraint arm that makes contact with the cargo and holds the cargo in place. Opposite the fastener is a free end that cantilevers from the fastener, thereby eliminating a need for additional structural members and simplifying the restraining process relative to the prior art. Because the end opposite the fastener is free, the tool can be oriented radially in virtually any direction ranging from substantially horizontal to substantially vertical.

Second, in one form of the invention, the tool includes an extension sleeve that attaches to the free end of the tool. The extension sleeve permits the restraint of cargo over a wide range of heights. As such, multiple units of cargo stacked atop one another can be positively restrained and reliance on friction between cargo surfaces or other unreliable means can be eliminated.

A typical use of the tool is as follows. Cargo is placed within a vehicle for the purpose of transport to another location. The transport process is such that expected acceleration loads induced on the cargo are of sufficient magnitude to cause unrestrained cargo to shift within the vehicle. A laterally extending load lock is affixed between longitudinal side walls of the vehicle such that the longitudinal acceleration loads transmitted from the cargo to the load lock will not be sufficient to cause the load lock to move from its position. The restraint tool is positioned relative to the cargo so that the restraint arm can make contact with the cargo after the tool is attached to the load lock. The fastening end of the tool (in an open position) is then positioned about the load lock with the restraint arm adjacent the cargo. The tool is moved laterally along the load lock until the flat surface of the restraint arm makes firm contact with the cargo. The fastener is then closed about the laterally extending load lock and clamped into place using a clamping feature integral to the fastener.

The opposing lateral side of the cargo can be restrained in one of two ways. One way is to position the cargo immediately adjacent a side wall of the vehicle and allow the vehicle side wall to prevent lateral movement of the cargo. The second way is to leave sufficient space between the side wall nearest the cargo side to be restrained and install another tool as described above. The two tools working in concert with each other and a common or different laterally extending load lock will restrain the cargo from moving laterally and increase resistance against moving longitudinally.

An optional feature of the tool allows two or more tools to be used in concert to restrain multiple units of cargo in the longitudinal direction. This feature consists of a rod, a rod receiving cavity, and a wing nut to hold the rod in place within the receiving cavity. Using this feature requires that an additional load lock be installed either fore or aft of the first load lock. A tool or tools are then installed on the additional load lock(s) as described above. The rod is then inserted into the rod receiving cavity and clamped in place in both tools. All cargo in contact with the rod is now restrained from moving laterally.

To remove the tool, the load locks, and the cargo simply perform the above processes in reverse order.

OBJECTS OF THE INVENTION

According, a primary object of the present invention is to restrain lateral movement of cargo within a vehicle.

Another object of the present invention is to provide a simple and versatile cargo restraint device.

Another object of the present invention is to restrain lateral movement of cargo using a cantilever restraint element.

Another object of the present invention is to provide a restraint tool that can increase the height of cargo that can be actively restrained.

Another object of the present invention is to provide a restraint tool that can increase the number of stacked cargo units that can be actively restrained.

Another object of the present invention is to provide a restraint tool that can reduce damage to cargo, transport vehicles, and property.

Another object of the present invention is to provide a restraint tool that can reduce road hazards associated with shifting loads.

Another object of the present invention is to provide a restraint tool that can increase flexibility of cargo placement within a transport vehicle.

Another object of the present invention is to provide a cargo restraint tool that easily attaches to and detaches from laterally extending load lock devices.

Another object of the present invention is to provide a cargo restraint tool that is elongatable.

Another object of the present invention is to provide a cargo restraint tool that easily adjusts to varying cargo widths.

Another object of the present invention is to provide a lateral restraint tool that attaches to only one laterally extending support member.

Other further objects of the present invention will become apparent from a careful reading of the included drawing figures, the claims and detailed description of the invention.

BRIEF DESCRIPTION OF THE DRAWINGS

FIG. 6 is a perspective view of four tools of this invention shown in an optional configuration that includes a rod connecting two tools on each side of the cargo to allow lateral restraint of multiple cargo items.

DESCRIPTION OF THE PREFERRED EMBODIMENT

Figure 1:
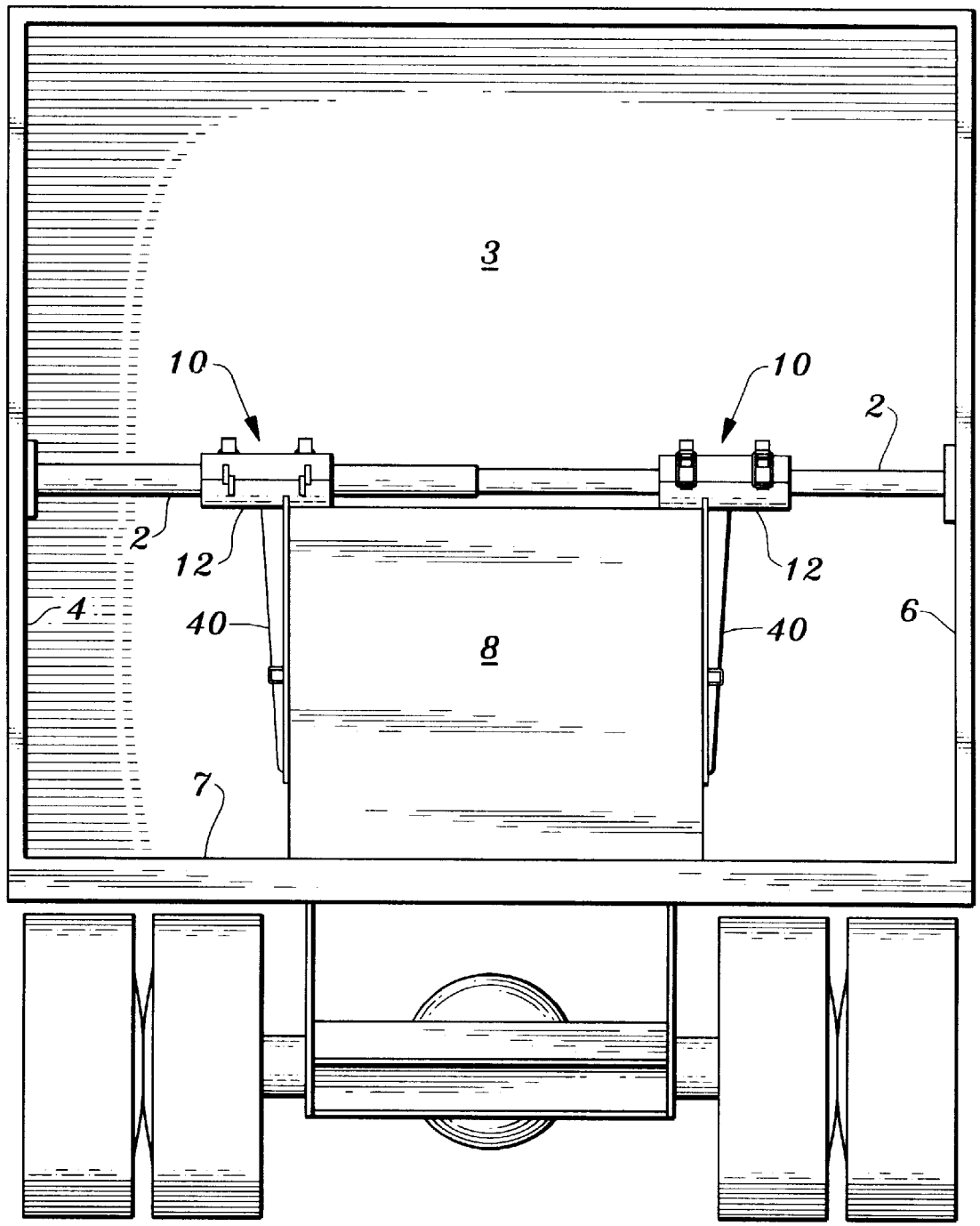
FIG. 1 is a side elevation view of two lateral vehicle cargo restraint tools of this invention grippably attached to a single laterally extending load lock device and installed about cargo as they would appear looking from the rear of an open trailer.
Figures 2, 3:
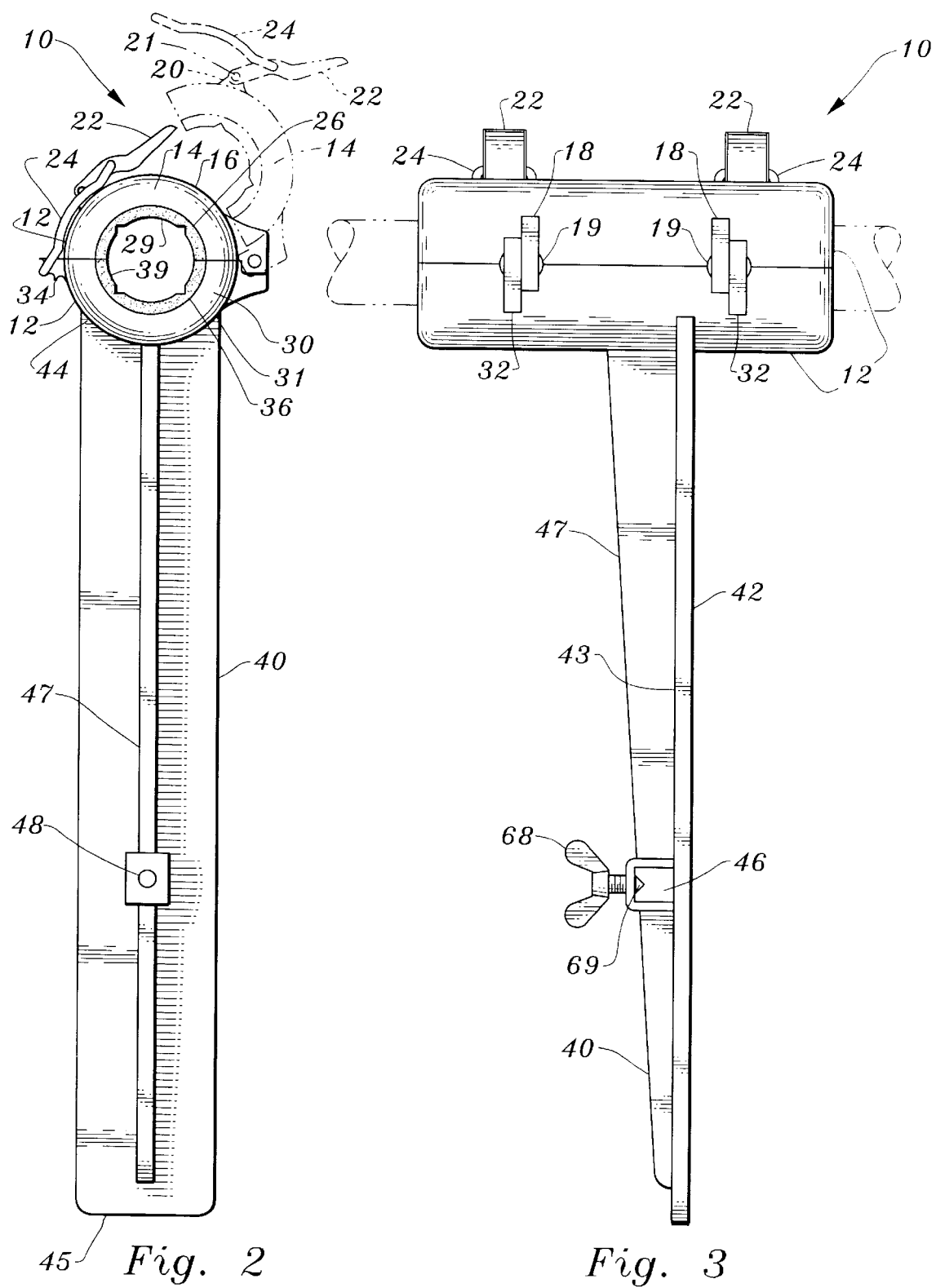
FIG. 2 is a front elevation view of the tool of this invention with the collar in a fully closed position (as represented by the solid lines) and an open position (as represented by the broken lines).
FIG. 3 is a right side view of the tool of this invention with the collar in a fully closed position about a portion of the laterally extending load lock device (as represented by the broken lines).

Referring to the drawings, wherein like reference numerals represent like parts throughout the drawing figures, reference numeral 10 is directed to a lateral vehicle cargo restraint tool (FIGS. 1–3). Included for clarity are a truck trailer cargo bay 3 and cargo 8 resting within the bay 3. The cargo 8 is resting on a trailer bed 7 and is situated between a first side wall 4 and second side wall 6. A laterally extending load lock device 2 abuts the first side wall 4 at one end and the second side wall 6 at the other end.

Figures 4, 5:
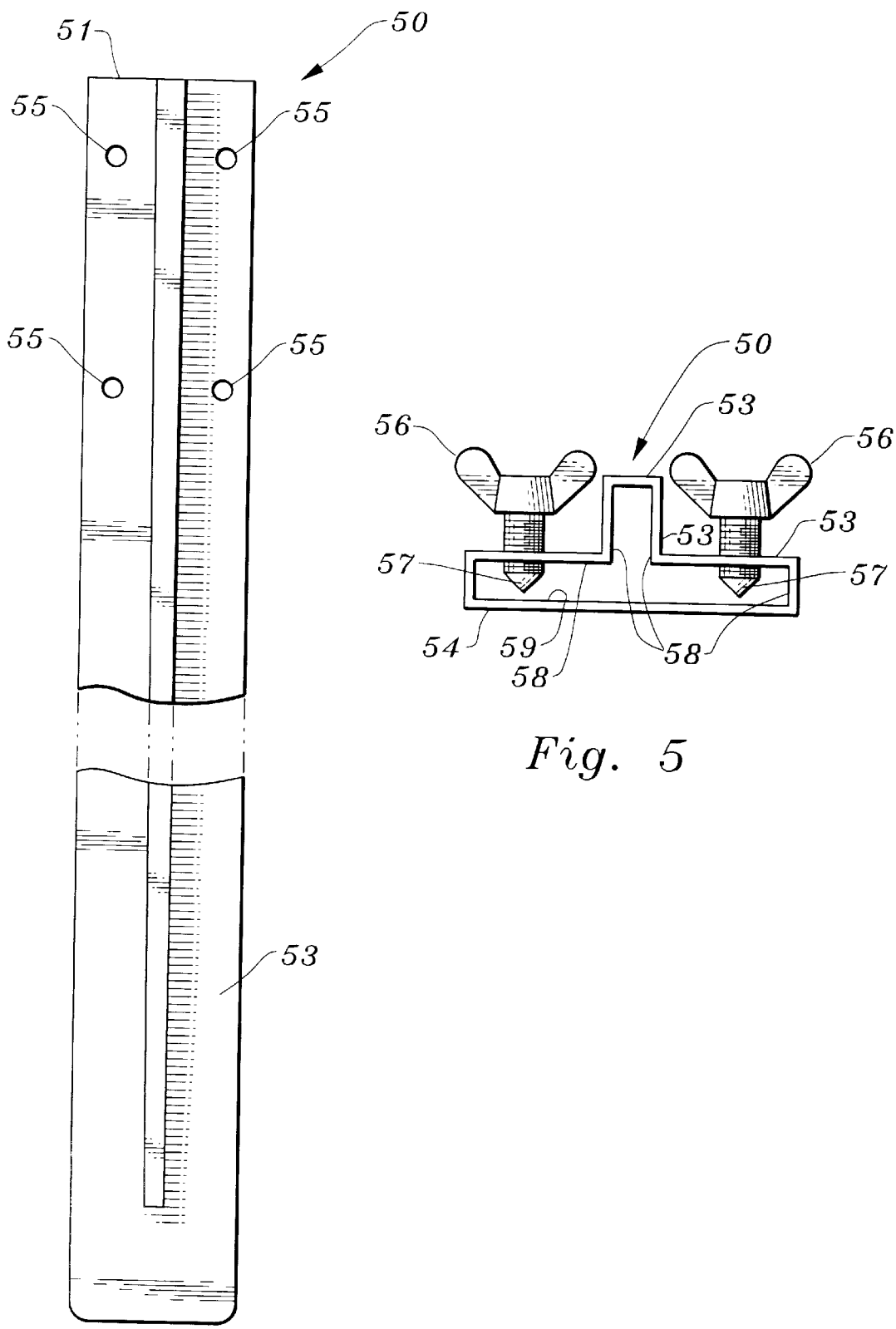
FIG. 4 is a front elevation view of an extension plate attachment for the tool of this invention.
FIG. 5 is a top plan view of the extension plate with wing bolts installed.

In essence, and with particular reference to FIGS. 2, 3 and 4 the tool 10 includes the load lock 2, a fastener 12, a restraint arm 40, and an optional extension sleeve 50 (FIGS. 4 and 5). The fastener 12 conformably attaches to the load lock 2 by positioning an upper jaw 14 above the load lock 2 and a lower jaw 30 below the load lock 2 and releasably clamping the fastener 12 about the load lock 2. The restraint arm 40 is integrally joined to the fastener 12 and extends radially from the lower jaw 30. A flat side 42 of the arm 40 typically makes contact with and restrains the cargo 8. The arm 40 has a free end 45 to which the extension sleeve 50 can be attached when additional length of contact with the cargo 8 is required. An optional feature of the tool 10 is a rod 60 (FIG. 6) for use with multiple tools 10 positioned longitudinally within the trailer bay 3. The rod 60 spans the longitudinally spaced tools 10, attaches to the free ends 45 of the tools 10, and thereby restrains all cargo 8 between the longitudinally spaced tools 10 (FIG. 6). While the tool 10 is described above as including the load lock 2, the tool 10 can alternatively be considered to include only the fastener 12 and arm 40 and be configured to attach to any separately provided laterally extending member.

More specifically, and with particular reference to FIGS. 2 and 3, the fastener 12 has a generally cylindrical shape with an annular cross-section formed by the upper jaw 14 and the lower jaw 30 when they are in the closed position (FIG. 2). The jaws 14, 30 are made of materials sufficiently rigid to withstand torsional and bending loads induced during cargo transport. Such materials could be metal such as steel or aluminum, composites, or sufficiently high strength rigid plastic.

The upper jaw 14 has an outer surface 16 upon which several other parts of the fastener 12 are disposed. At one side of the upper jaw 14 are two clamp hinge tabs 20 (FIGS. 2 and 3). The clamp tabs 20 are integrally joined to the outer surface 16 of the upper jaw 14 at substantially equal distances from the ends of the fastener 12. The clamp tabs 20 each have a cylindrical hole running longitudinally through them to accommodate a clamp pin 21. The clamp pin 21 and a clamp lever 22 are rotatably attached to the clamp tab 20 (FIG. 2) thereby allowing the clamp lever 22 to pivot freely about the tab 20. The clamp lever 22 has an elongate, planar shape with sufficient thickness to accommodate a section of a clamp hoop 24 running through the interior of the lever 22. The hoop 24 is essentially a solid, rigid material, such as steel with a generally circular cross section formed into a shape that is generally rectangular in one plane (FIG. 6). One section of the hoop 24 passes through holes in the sides of the clamp lever 22 in a manner that allows the hoop 24 to rotate freely about the lever 22. As such the clamp levers 22 and clamp hoops 24 can pivot independently relative to each other.

At another side of the upper jaw 14 are two inner hinge tabs 18 (FIG. 3) integrally joined to the outer surface 16 at locations spaced substantially equal distances from the ends of the fastener 12. The inner hinge tabs 18 have a generally trapezoidal cross section that extends somewhat below the upper jaw 14 and adjacent the lower jaw 30. Each inner tab 18 has a longitudinal hole of sufficient diameter to accommodate a longitudinally oriented pintle 19. The hole is positioned in the inner tabs 18 such that its centers lie substantially within a horizontal plane passing through the center of the fastener 12.

A lower jaw 30 likewise has an outside surface 31 upon which several parts of the fastener 12 are disposed. At one side of the lower jaw 30 are two outer hinge tabs 32 (FIGS. 2 and 3) integrally joined to the outside surface 31 at locations substantially equidistant from the ends of the fastener 12 have essentially the same cross-sectional shape as the inner hinge tabs 18. The outer hinge tabs 32 are located at distances somewhat less than the ends of the fastener 12 than are the inner hinge tabs 18. The outer hinge tabs 32 extend somewhat above the lower jaw 30 adjacent the upper jaw 14. Each outer hinge tab 32 has a longitudinal hole essentially the same diameter as the hole of the inner hinge tab 18 and accommodates the pintle 19.

The inner hinge tab 18 and an outer hinge tab 32 are aligned immediately adjacent each other, with the pintle 19 situated therein. The other pair of hinge tabs 18, 32 are likewise configured near the other end of the fastener 12. This arrangement permits the upper jaw 14 to pivotally rotate away from the lower jaw 30 as shown in FIG. 2 in broken lines.

At the other side of the lower jaw 30 are two clamp latches 34 (FIG. 2). The clamp latches 34 are integrally joined to the outside surface 31 of the lower jaw 30 at substantially equal distances from the ends of the fastener 12. Each latch 34 is somewhat narrower than the interior width of the unattached end of the clamp hoop 24. The latch 34 is positioned longitudinally such that it is contained within the interior of the clamp hoop 24 when the clamp hoop is positioned about the latch 34 (FIG. 2). The latch 34 has a series of notches which restrain the clamp hoop 24 while the fastener is in the clamped position (FIG. 2).

The upper jaw 14 and lower jaw 30 form an interior, cylindrical cavity that fits about the laterally extending load lock device 2 when the fastener 12 is in the closed position (FIG. 2). The upper jaw 14 has an inner surface 26 with a semi-cylindrical concave shape that forms half the cylindrical cavity. The upper jaw 30 has a semi-cylindrical concave inside surface 36 that forms the opposing half of the cavity. The inner surface 26 and inside surface 36 have an upper liner 29 and a lower liner 39, respectively, conformably attached. The larger diameter side of the upper liner 29 conformably adheres to the inner surface 26 of the upper jaw 14 whereas the larger diameter of the lower liner 39 conformably adheres to the inside surface 36 of the lower jaw 40. The liners 29, 39 form a generally annular cross section when the fastener is in the closed position. Each liner 29, 39 has two notches of generally triangular shape located in the right and left quadrants of the liners 29, 39 (FIG. 2). The notches allow the liners 29, 39 to grippably hold rectangular cross section load locks.

In the preferred embodiment of this invention, the liners 29, 39 are made of rubber and are attached to the surfaces 26, 36 of the jaws 14, 30 using high strength adhesive that is relatively insensitive to temperature. However, any resilient material with adequate strength characteristics is acceptable. Likewise, any form of attachment of the liners 29, 39 is acceptable such as diffusion bonding or mechanical fastening.

The restraint arm 40 has a top end 44 integrally joined to the outside surface 31 of the lower jaw 30. The arm 40 is a generally planar piece with a preferably T-shaped cross-section over most of its length. The arm 40 is positioned longitudinally slightly off a center of the fastener 12 (FIG. 3) and extends radially downward from the outside surface 31 of the lower jaw 30. The arm 40 may be located at different positions on the fastener 12 such as closer to the front, closer to the back, or at any location between the front and back of the fastener 12.

The arm 40 preferably has a flat side 42 that conformably adjoins the outside surface 31 of the lower jaw 30. The flat side 42 is essentially in a vertically oriented plane and runs the entire length between the top end 44 and the free end 45. When the tool 10 is installed on the load lock 2 (FIGS. 1 and 6), the flat side 42 is in direct contact with the cargo 8. Opposite the flat side 42 is a gusset side 43. The gusset side 43 also conformably adjoins the outside surface 31 of the lower jaw 30.

The gusset side 43 is essentially flat except for a portion of its surface. At the center of the gusset side 43 a reinforcing gusset 47 is preferably located that extends from the outside surface 31 to a point near the bottom of the free end 45 and arm 40. The reinforcing gusset 47 extends perpendicularly from the flat portion of the gusset side 43 surface and has a substantially constant thickness approximately one-fifth the width of the gusset side 43. The height of the gusset 47 tapers from a maximum height of approximately one-seventh of the fastener 12 length at the outside surface 31 of the lower jaw 30 to "0-height" near the bottom of the free end 45.

Interposed along the gusset 47 a rod receiving cavity 46 is preferably located that passes entirely through the thickness of the gusset 47 parallel to the flat surface of the gusset side 43. The rod cavity 46 has an essentially rectangular cross-section with two sides essentially parallel and two sides essentially perpendicular to the flat portion of the gusset side 43 surface. The rod cavity 46 interior dimensions are essentially the same as the exterior dimensions of the cross section of a rod 60 described in detail below. The outer parallel side of the cavity includes a threaded bolt receiving hole 48 that accommodates a first wing bolt 68. The interrelationship between the rod 60, the first wing bolt 68, the first bolt receiving hole 48, and the rod receiving cavity 46 will be discussed in greater detail below.

The taper ratio, thickness, surface location, length, and maximum height of the gusset 47 in the preferred embodiment of this invention are merely representative. A wide variety of combinations can be used as long as the load requirements can be accommodated without causing damage to the tool 10 or the cargo 8. The arm 40 provides one form of a means to restrain cargo from lateral movement. This restraint means can take on various configurations including non-linear configurations and non-elongate configurations where the arm or other restraint means presents a structure adjacent a lateral side of the cargo 8 that resists cargo 8 lateral motion.

A first optional feature of the tool 10 is an extension sleeve 50 (FIGS. 4 and 5). The sleeve 50 is rigid and has a generally planar exterior shape similar to that of the arm 40. The sleeve 50 has a flat outer surface 54 that is essentially equivalent in shape and positioning relative to the cargo to that of the arm 40 flat side 42. Likewise, the sleeve 50 has a gusset outer surface 53 that is essentially equivalent in shape and positioning relative to the cargo to that of the gusset side 43 of the arm 40.

However, the sleeve 50 has a hollow interior formed to allow the free end 45 of the arm 40 to be partially inserted therein. After the free end 45 of the arm 40 is inserted into an arm receiving end 51 of the sleeve 50, the gusset side 43 of the restraint arm 40 conforms to the gusset inner surface 53 of the sleeve 50. Concurrently, the flat side 42 of the arm 40 conforms to the flat inner surface 59 of the sleeve 50.

Four second bolt receiving holes 55 are located on the gusset outer surface 53 of the arm receiving end 51. The holes 55 penetrate the entire thickness between the gusset outer surface 55 and the gusset inner surface 58. The holes 55 are threaded and of sufficient diameter to accommodate four second wing bolts 56. The second wing bolts 56 each have a second bolt tip 57 that penetrates the interior of the sleeve 50 when twisted into place. The second holes 55 and second bolts 56 provide one form of a means to attach the sleeve 50 to the arm 40. Other attachment means could be utilized, such as adhesives, friction clasps, or spring loaded tabs engaging notches in sides of the arm 40. The dimensional relationships between the free end 45 of the arm 40, the interior of the sleeve 50, and the second bolt receiving holes 55 are such that the second bolt tips 57 will contact the flat portion of the gusset side 43 surface after the free end 45 is inserted in the sleeve 50.

The sleeve 50 provides one form of a means to adjustably extend a length of the arm 40 to restrain larger cargo 8 from lateral motion. Other extension means could include replaceable arms of differing length, a hinged or otherwise collapsible arm, a nested telescoping rod within the arm or other related structures.

With particular reference to FIGS. 1, 2 and 3 the use and operation of the tool 10 is provided. In a typical use of the tool 10, first cargo 8 is centered within the trailer bay 3 on the trailer bed 7. The load lock 2 is installed between the first and second side walls 4, 6 and above the cargo 8. The load lock 2 is positioned a sufficient height above the cargo 8 to allow the lower jaw 30 of the fastener 12 to fit between the top of the cargo 8 and the load lock 2. The fastener 12 is opened and the liners 29, 39 positioned loosely about the load lock 2. The installer then slides the tool 10 towards the cargo 8 until the cargo 8 and flat side 42 of the arm 40 are in substantially complete contact.

The upper jaw 14 is then closed about the load lock 2 to the greatest extent practical prior to locking down the clamp levers 22. One clamp lever 22 is then rotated toward its matching clamp latch 34 until the clamp hoop 24 engages one of the notches on the clamp latch 34. The installer holds the clamp hoop 24 in contact with the latch while concurrently rotating the clamp lever 22 away from the clamp latch 34 until the clamp lever 22 locks into place on or near the outer surface 16 of the upper jaw 14. The installer repeats the latching steps to lock down the other clamp lever 22 on the upper jaw 14.

The tool 10 is now firmly in position to prevent the cargo 8 from moving laterally towards the first side wall 4 of the trailer bed 3. The installer then repeats the tool 10 installation steps on the opposing side of the cargo 8 and the cargo 8 is restrained from moving laterally towards the second side wall 6. If one side of the cargo 8 were to be placed against one side wall of the trailer bed 3, the installer will need to put only one tool 10 into place. After the cargo 8 reaches its destination, the tool 10 and cargo 8 can be removed by performing the steps above in reverse order.

In a typical use of the extension sleeve 50, the installer would precede the steps outlined above with steps to attach the sleeve 50 to the free end 45 of the restraint arm 40. The installer would first position the free end 45 of the arm 40 above the arm receiving end 51 of the sleeve 50. He would then align the flat side 42 of the arm 40 with the flat inner surface 59 of the sleeve 50. He would also align the gusset side 43 of the arm 40 with the gusset inner surface 58 of the sleeve 50 and slide the arm 40 into the sleeve 50 until the gusset 47 prevents any further movement. He would then insert each second wing bolt 56 into the second bolt receiving holes 55 and rotate each second wing bolt 56 until each tip 57 makes firm contact with the flat portion of a gusset side 43 of the arm 40. Contact between the bolt tips 57 and the flat portion of the gusset side 43 surface prevents the arm from sliding out of the sleeve 50. The conformal shaping of the parts prevents movement in other directions.

A second optional feature of the tool 10 is the rod 60 (FIG. 6). The rod 60 restrains multiple units of cargo 8 distributed along the longitudinal axis of the trailer bay 3 from moving excessively in the lateral direction. The rod 60 is a solid rigid elongate member with a preferably relatively constant cross-sectional shape. The cross-section of the rod 60 is basically rectangular and has exterior dimensions somewhat smaller than the interior dimensions of the rod receiving cavity 46. As such, the rod 60 can slidably fit therein. A front end 62 of the rod 60 rests within the cavity 46 of one tool 10 while an aft end 64 of the rod 60 rests within another cavity 46 of another tool 10. The tools 10 are longitudinally spaced such that each laterally supports an end unit of cargo 8 (FIG. 6). The rod 60 is held within the cavity 46 by frictional contact between a first bolt tip 69 of the first wing bolt 68 after the wing bolt 68 is screwed tightly into the first bolt receiving hole 48.

With particular reference to FIGS. 2, 3 and 6, the use and operation of the rod 60 is as follows. In a typical use of the rod 60 multiple units of cargo 8 are loaded along the longitudinal axis of the trailer bed 7 (FIG. 6). A load lock 2/tool 10 combination is installed on the front most unit of cargo 8 as described above. A second lock 2/tool 10 combination is likewise installed on the aft most unit of cargo 8. The front end 62 of the rod 60 is slidably inserted in the aft facing portion of the rod receiving cavity 46 and "fed" through the cavity 46 until the front end 62 can be grabbed and pulled. The rod 60 is then pulled and inserted through the cavity 48 of the front most tool 10. The rod 60 is positioned to have some of the rod 60 forward and some of the rod 60 aft of the front most and aft most tools 10, respectively.

The first wing bolts 68 are then inserted and twisted into the first bolt receiving holes 48 of each tool 10 until there is sufficient frictional force between the first wing bolt tip 69 and an exterior surface of the rod 60 to hold the rod 60 in place under all anticipated loads.

The same procedure is performed for the rod 60 and tool 10 combinations from the opposing side of the cargo 8. The rods 60 therefore provide barriers to the middle unit of cargo 8 to prevent excessive lateral movement.

This disclosure is provided to reveal a preferred embodiment of the invention and a best mode for practicing the invention. Having thus described the invention in this way, it should be apparent that various different modifications can be made to the preferred embodiment without departing from the scope and spirit of this disclosure. When structures are identified as a means to perform a function, the identification is intended to include all structures which can perform the function specified.

What is claimed is:

1. A tool for restraining lateral motion of cargo, comprising in combination:

a vehicle having two laterally spaced side walls;

at least one laterally extending member extending between said side walls;

a rigid arm having an attached end and a free end opposite said attached end said arm having a length between said attached and said free end greater than a width of said arm;

said attached end of said arm having a laterally extending member fastener thereon, such that said attached end of said arm can fasten to said laterally extending member; and said fastener including a cavity passing therethrough, said cavity having open ends and selectively openable sides extending between said ends, said sides spaced apart to define a width of said cavity at least as large as said laterally extending member, such that said laterally extending member can extend through said ends of said cavity and fit within said cavity of said fastener.

2. The tool of claim 1 wherein said arm includes a means to adjustably extend said free end away from said laterally extending member.

3. The tool of claim 2 wherein said means to adjustably extend is an extension sleeve and a means to attach said extension sleeve to said arm.

4. The tool of claim 1 wherein said arm is capable of being radially extended by releasably attaching an extension sleeve to said free end of said arm.

5. The tool of claim 1 wherein said selectively openable sides of said cavity of said fastener pivot relative to each other sufficiently to allow said laterally extending member to pass into said cavity when said selectively openable sides are pivoted away from each other.

6. The tool of claim 5 wherein said selectively openable sides of said cavity of said fastener includes an upper jaw, a lower jaw, and a means to rotatably hold said upper jaw and said lower jaw together.

7. A tool for restraining lateral motion of cargo, comprising in combination:

a vehicle having two laterally spaced side walls;

at least one laterally extending member extending between said side walls;

an arm having an attached end and a free end opposite said attached end; and said attached end of said arm having a laterally extending member fastener thereon, such that said attached end of said arm can fasten to said laterally extending member;

wherein said laterally extending member fastener includes a means to removably attach to said laterally extending member, said removable attachment means resisting lateral and rotational movement of said fastener about said laterally extending member;

wherein said fastener includes an upper jaw, a lower jaw, and a means to rotatably hold said upper jaw and said lower jaw together; and wherein said rotatably holding means includes at least one hinge tab on an outer surface of said upper jaw, at least one hinge tab on an outside surface of said lower jaw, a pintle passing at least partially through each said hinge tab and at least one means to at least partially close said jaws together around said laterally extending member, said closing means opposite said hinge tabs.

8. The tool of claim 7 wherein said closing means includes a clamp lever rotatably attached to said outer surface of said upper jaw opposite said hinge tab of said upper jaw, a clamp hoop rotatably attached to said clamp lever, and a clamp latch integrally joined to said outside surface of said lower jaw, said clamp latch positioned relative to said clamp hoop to allow said hoop to slide over said clamp latch.

9. A tool for restraining lateral motion of cargo, comprising in combination:

a vehicle having two laterally spaced side walls;

at least one laterally extending member extending between said side walls;

an arm having an attached end and a free end opposite said attached end; and said attached end of said arm having a laterally extending member fastener thereon, such that said attached end of said arm can fasten to said laterally extending member;

wherein said laterally extending member fastener includes a means to removably attach to said laterally extending member, said removable attachment means resisting lateral and rotational movement of said fastener about said laterally extending member; and wherein said fastener includes a resilient liner which can conform somewhat to the external shape of said laterally extending member when said fastener is attached to said laterally extending member.

10. The tool of claim 9 wherein said resilient liner includes at least one notch therein.

11. The tool of claim 9 wherein said arm includes a flat side oriented perpendicular to said laterally extending member, and a gusset side opposite said flat side, said gusset side including a gusset thereon.

12. The tool of claim 11 further including a rod, wherein said arm includes a rod retaining cavity formed in said gusset side, said rod having an exterior surface that is slidably receivable into said cavity, and a means to pinch said rod adjacent said cavity such that said rod is substantially prevented from moving within said cavity.

* * * * *